United States Patent [19]
Yousefzadeh

[11] Patent Number: 5,916,124
[45] Date of Patent: Jun. 29, 1999

[54] FINIAL-ADAPTIVE PULL CHAIN

[76] Inventor: Kamran Yousefzadeh, 1727 South Bentley Ave. #102, Los Angeles, Calif. 90025

[21] Appl. No.: 08/955,945
[22] Filed: Oct. 22, 1997
[51] Int. Cl.$^6$ .................................................... F16G 15/00
[52] U.S. Cl. ................................. 59/93; 428/28; 362/404
[58] Field of Search ............................ 59/93, 80, 3, 78; 428/28; 362/404, 384

[56] References Cited

U.S. PATENT DOCUMENTS

| | | |
|---|---|---|
| 1,189,101 | 6/1916 | Hannan ........................................ 59/93 |
| 1,355,193 | 10/1920 | Van Amberg ............................... 59/93 |
| 2,117,137 | 5/1938 | Blatz ........................................... 59/93 |
| 2,232,512 | 2/1941 | Clifford ...................................... 428/28 |
| 4,956,758 | 9/1990 | Aubrey et al. .......................... 362/285 |
| 5,262,209 | 11/1993 | Sawyer . | |
| 5,339,618 | 8/1994 | Sawyer . | |
| 5,613,772 | 3/1997 | Sawyer . | |

*Primary Examiner*—David Jones
*Attorney, Agent, or Firm*—Scot A. Reader

[57] ABSTRACT

A finial-adaptive pull chain has a bead chain disposed between an adaptor and a spring assembly. The adaptor retains the terminal bead of the bead chain, has external threads on the lower portion for receiving a finial and has a gripping surface on the upper portion to facilitate hand-manipulation during attachment. The upper portion has a diameter no greater than the lower portion so that the adaptor is substantially hidden from view when a finial is fully attached and does not unduly interfering with the decorative requirements of any end-user. The spring assembly has a spring for absorbing dynamic tensile forces applied during activation and deactivation to reduce the risk that the end-user will damage the electrical components of the associated device.

14 Claims, 1 Drawing Sheet

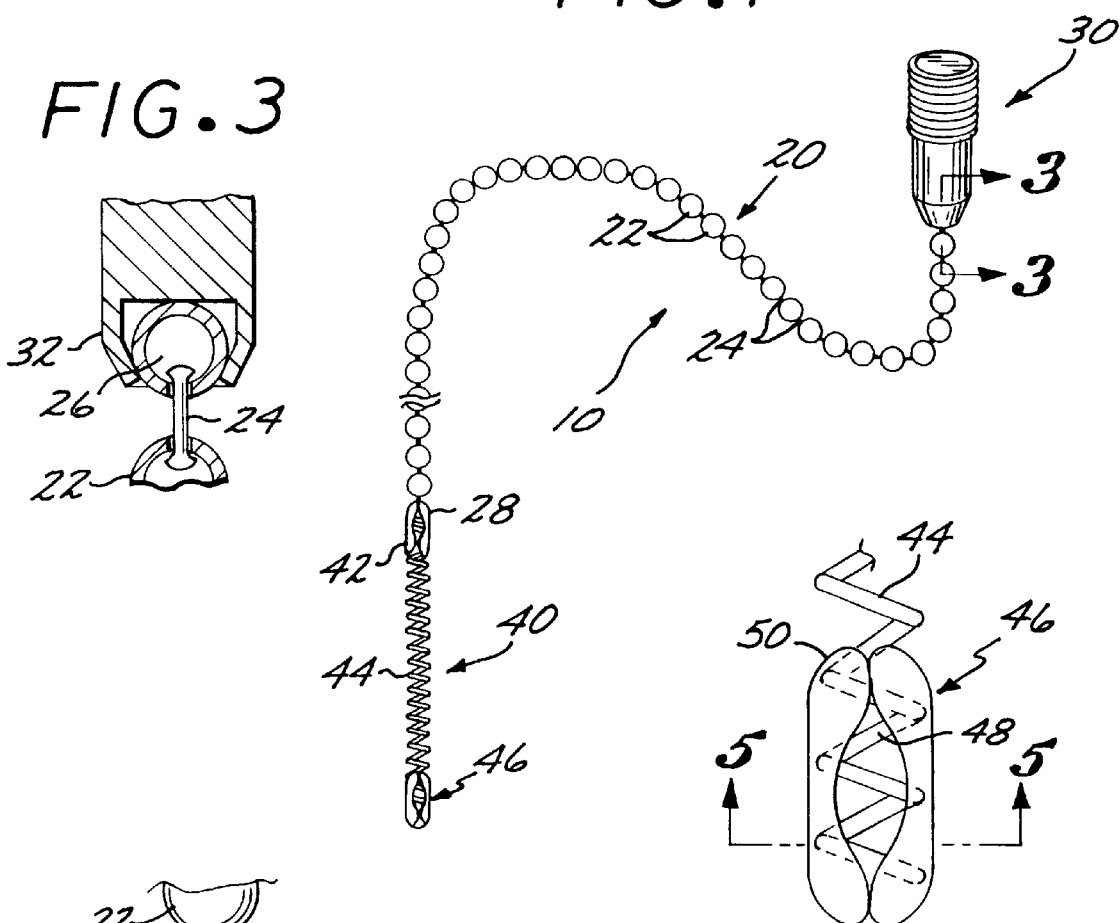
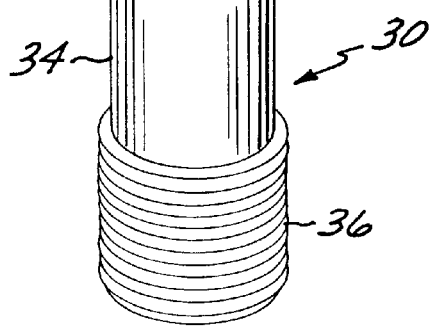

5,916,124

FINIAL-ADAPTIVE PULL CHAIN

FIELD OF THE INVENTION

The present invention relates to pull chains and, more particularly to pull chains adapted to receive decorative finials.

BACKGROUND OF THE INVENTION

Finials are ornamental objects whose primary known use is to beautify the top of table lamps. The decorative portion of finials is known to be designed in many sizes, shapes and styles, with each different design providing a unique visual appearance, while the mating or attaching portion is generally of a standard size so that the finial can be mounted atop most finial-receiving table lamps. Recently, efforts have been made to extend the benefits of decorative finials beyond the top of table lamps by adapting other utilitarian objects to receive standard-sized finials. See, e.g., Yousefzadeh, Application Ser. No. 08/683,259, now U.S. Pat. No. 5,758,850. Among these efforts have been those targeted to adapt a pull chain for a utilitarian device, such as a lamp or a ceiling fan, to receive a finial. Prior art finial-adaptive pull chains include those illustrated in Sawyer, U.S. Pat. No. 5,339,618. Therein, a first pull chain is illustrated having a cumbersome two-piece bell-shaped finial adaptor in which a bell-shaped upper portion of the adaptor is suspended loosely on an oversized terminal bead of a bead chain (See FIG. 3 of U.S. Pat. No. 5,339,618). A second pull chain is illustrated having a one-piece finial adaptor which is loosely suspended upon a similarly oversized terminal bead (See FIG. 2 of U.S. Pat. No. 5,339,618). Both of these illustrated prior art pull chain adaptors have a lip on the upper portion of the adaptor which limits the travel distance up the adaptor of an attached finial and remains fully exposed when the finial is attached.

While the efforts such as those exemplified in Sawyer have extended the visual benefits of finials to the field of pull chains, they have significant disadvantages associated with them. A primary disadvantage is the inability to adequately absorb the dynamic tensile stresses placed on the pull chain by end-users attempting to activate or deactivate the associated device. This weakness has manifested itself in a significant risk that the pull chain will become disconnected from or cause severe damage to the electrical switching components of the associated device. Known designs also include design complexities in the adaptor which give rise to further disadvantages. For instance, known adaptors have been known to include a large diameter upper portion which remains exposed after finial attachment. Adaptors remaining in plain view may undesirably clash with the decorative requirements of the end-user. Thus, there is a need for a sturdier, simpler and more aesthetically appealing finial-adaptive pull chain which addresses these and other limitations of the prior art.

SUMMARY OF THE INVENTION

In one aspect of the present invention, a finial-adaptive pull chain is provided which absorbs the dynamic tensile stresses to which the pull chain is subjected during normal use. Tensile stresses are absorbed by advantageously attaching a tension-absorbing spring along the length of the pull chain. When the pull chain is pulled to activate or deactivate an associated device the spring extends and absorbs tensile stresses which would otherwise be placed on the junction between the pull chain and the electrical components of its associated device. The risk that the pull chain will become disconnected from or damage the electrical components of the associated device is thereby advantageously reduced.

In another aspect of the present invention, the adaptor of the finial-adaptive pull chain has a gripping surface no greater in diameter than a threaded surface of the adaptor. The gripping surface may advantageously be hand-manipulated to initiate the mating of the adaptor and a finial while allowing the adaptor to become substantially hidden from plain view when a finial is fully attached. The adaptor thus assists in finial attachment without unduly interfering with the aesthetic requirements of an end-user.

These and other features and advantages of the invention will become apparent from the following more detailed description, taken in conjunction with the drawings briefly described below. Of course, the actual scope of the invention is limited only by the appended claims.

BRIEF DESCRIPTION OF THE DRAWINGS

FIG. 1 is a front elevational view of an adaptive pull chain in accordance with the present invention;

FIG. 2 is an enlarged front elevational view of an adaptor of the adaptive pull chain according to FIG. 1;

FIG. 3 is a partial cross-sectional view taken at 13—13 of the adaptor according to FIG. 2;

FIG. 4 is an enlarged front elevational view of a spring connector of the adaptive pull chain according to FIG. 1; and FIG. 5 is a cross-sectional view taken at 15—15 of the spring connector according to FIG. 4.

DETAILED DESCRIPTION OF THE PREFERRED EMBODIMENT

Referring to FIG. 1, in a preferred embodiment of the invention, a finial-adaptive pull chain 10 is shown. Pull chain 10 includes bead chain 20, spring assembly 30 and adaptor 40, wherein bead chain 20 is disposed between adaptor 30 and spring assembly 40. Bead chain 20 is preferably a conventional bead chain including a plurality of beads 22 connected by wires 24. Beads 22 are preferably of a uniform size. Bead chain 20 has terminal beads 26, 28 at the ends of chain 20. Bead 26 is retained in the upper end of adaptor 30. Bead 28 is retained in a connector 42 associated with spring assembly 40. Spring assembly 40 includes a spring 44 mounted between connectors 42, 46. Spring 44 has shape-retaining properties such that spring 44 extends when tensile forces are applied to pull chain 10 and returns to its approximate original length when the tensile forces are removed. Connector 46 is preferably connected to an adjoining bead chain (not shown) which may be applied to electrical components to enable the activation or deactivation of an associated device, such as a fan or a lamp.

Turning to FIGS. 2 and 3, the construction of adaptor 30 is shown in greater detail. Adaptor 30 is preferably a one-piece adaptor, although the adaptor may be composed of two or more pieces, if desired. Adaptor 30 is preferably generally cylindrical and has a diameter greater than terminal bead 26. Adaptor 30 has an upper portion 32 having a cavity for retaining terminal bead 26. The interior of the upper portion 32 preferably collapses at the junction between bead chain 20 and adaptor 30 to retain terminal bead 26 within the cavity. Retention may be achieved by tapering upper portion 32 as shown in FIGS. 2 and 3. Adaptor 30 also preferably has an exterior gripping surface 34 for receiving human fingers when initiating finial attachment. Upper portion 32 is preferably no greater in diameter than the remainder of adaptor 30 so that adaptor 30 becomes substantially hidden from view when the finial is fully attached, to avoid interfering unduly with the aesthetic requirements of any end-user. The length of gripping surface 34 is preferably informed by requirements of hand-manipulation and the desirability of making the adaptor unobtrusive when a finial is fully attached. The lower end of adaptor 30 has external threads 36 for mating with the internal threads of a finial. External threads 36 are preferably ¼"-27 or ⅛" IPS for engaging a standard-sized finial. As shown, threads 36 preferably extend substantially to the bottom of adaptor 30 so that the finial can be directly and snugly received thereon. It will be appreciated that the mating portion of some finials may not be of sufficient length to fully cover adaptor 30 when fully attached such that adaptor 30 may remain partially exposed.

Referring now to FIGS. 4 and 5, connector 46 is shown in greater detail in conjunction with spring 44 retained therein. Connector 46 is of a type well-known to the art used generally for stringing two bead chains together by retaining the terminal bead of each bead chain at opposite ends of the connector cavity. In the present invention, however, connector 46 is employed to retain spring end coils 48 at one end. Although not shown, the end of connector 46 opposite the end which holds end coils 48 retains a terminal bead of a bead chain (not shown) which may be advantageously connected to the electrical components of an associated device, such as a fan or lamp. As illustrated in FIGS. 4 and 5, spring 44 has a diameter that will allow end coils 48, when pull chain 10 is placed under tension, to come into firm abutment with end of connector 50 causing spring 44 to extend and absorb a substantial amount of the tensile forces applied to pull chain 10. Connector 42 at the opposite end of spring 44 is constructed and interoperates with spring 44 in a like manner, but retains terminal bead 28 associated with bead chain 20 at the end opposite the end which retains end coils of spring 44.

It will therefore be understood from the foregoing that the present invention provides considerable improvements over the aforementioned prior art in normal use in the form of unobtrusiveness of the adaptor and substantial reduction of the risk of disconnection or electrical component damage. It will also be apparent from the foregoing that, while particular forms of the invention have been illustrated and described, various modifications can be made without departing from the scope and spirit of the invention. Accordingly, it is not intended that the invention be limited except by the appended claims.

I claim:

1. A finial-adaptive pull chain, comprising:

a bead chain including two terminal beads and a plurality of intermediary beads, the terminal beads and the intermediary beads having a substantially uniform diameter; and a generally cylindrical adaptor at one end of the bead chain, the adaptor having an upper portion and a lower portion, the upper portion having a cavity for retaining a terminal bead of the bead chain, the lower portion having external threads for engaging a finial, wherein the diameter of the lower portion is at least as great as the diameter of the upper portion.

2. The finial adaptive pull chain according to claim 1, wherein the upper portion is tapered at the junction between the bead chain and the terminal bead.

3. The finial-adaptive pull chain according to claim 1, wherein the upper portion has a gripping surface.

4. The finial-adaptive pull chain according to claim 1, wherein the external threads are size ¼"-27.

5. The finial-adaptive pull chain according to claim 1, wherein the external threads are size or ⅛" IPS.

6. A finial-adaptive pull chain, comprising:

a bead chain;

an adaptor at a first end of the bead chain, the adaptor having an upper portion and a lower portion, the upper portion having a bead cavity for retaining the terminal bead of the first end of the bead chain, the lower portion having external threads for engaging a finial; and a spring assembly at a second end of the bead chain, the spring assembly having a connector and a spring, the connector defining a connector cavity for retaining the terminal bead of the second end of the bead chain at one end of the connector and end coils of the spring at the other end of the connector.

7. The finial-adaptive pull chain according to claim 6, wherein the spring has shape-retaining characteristics.

8. The finial adaptive pull chain according to claim 6, wherein the upper portion is tapered at the junction between the bead chain and the adaptor.

9. The finial-adaptive pull chain according to claim 6, wherein the spring assembly includes a second connector, the second connector defining a second connector cavity for retaining end coils of the spring at one end of the second connector.

10. The finial-adaptive pull chain according to claim 6, wherein the upper portion has a gripping surface.

11. The finial-adaptive pull chain according to claim 6, wherein the bead chain includes a plurality of uniformly-sized beads.

12. The finial-adaptive pull chain according to claim 6, wherein the external threads are size ¼"-27.

13. The finial-adaptive pull chain according to claim 6, wherein the external threads are size or ⅛" IPS.

14. The finial-adaptive pull chain according to claim 6, wherein the adaptor is generally cylindrical.

* * * * *